Patented June 2, 1953

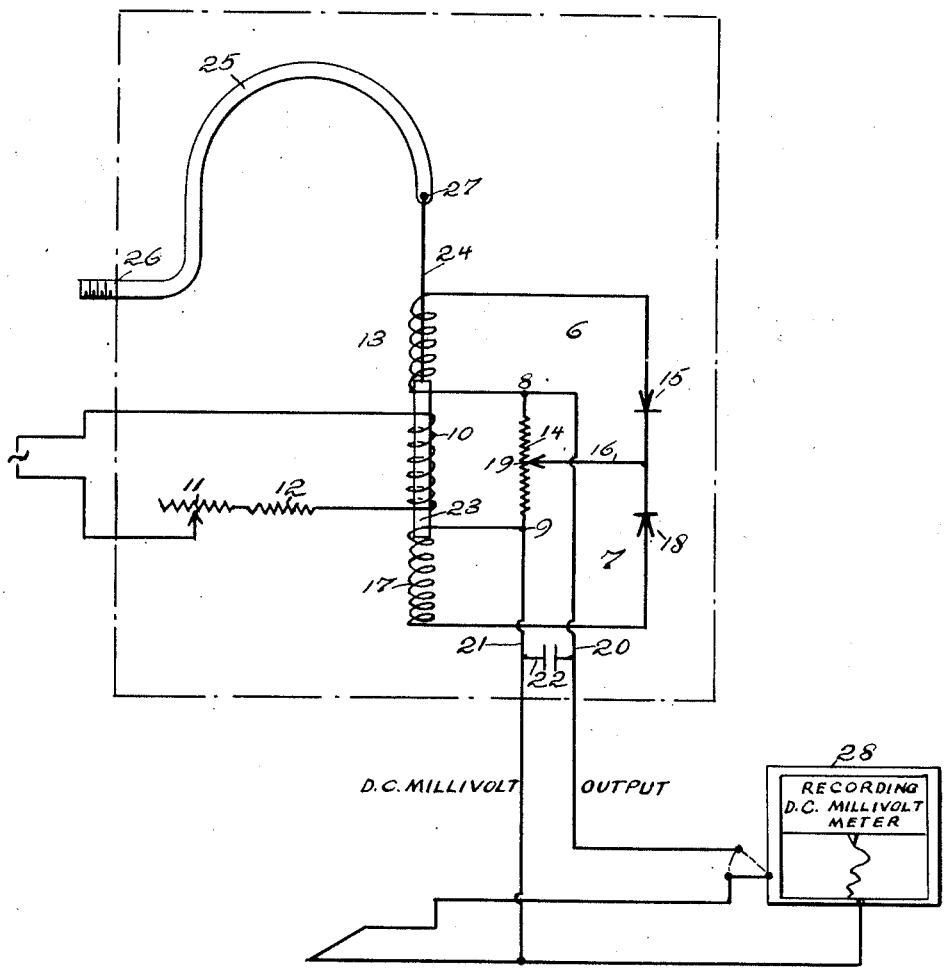

2,640,971

UNITED STATES PATENT OFFICE 2,640,971

D. C. MILLIVOLTAGE SIGNAL FROM AN A. C. ACTUATED DIFFERENTIAL TRANSFORMER

William D. Macgeorge, Collegeville, Pa., assignor to Automatic Temperature Control Co., Inc., Philadelphia, Pa., a corporation of Pennsylvania Application May 18, 1950, Serial No. 162,759

1 Claim. (Cl. 340—196)

This invention relates to a method and apparatus for producing D. C. millivoltage signals proportional to the displacement of the armature of a differential transformer excited by controlled A. C.

In industrial furnace and like installations, there are many instruments, recorders and meters which respond to D. C. millivoltage. A typical, but purely illustrative instance is a thermocouple or plurality of thermocouples having outputs of millivoltages of D. C. fed to recorders and like instruments for indication and control purposes. In connection with such installations and such metering and recording instruments, which represent appreciable financial investments, it is to be noted that according to prior practices they are related to their predetermined millivoltage sources and have no other utility. On the other hand, there are in such plants many different devices susceptible to and responding to variations of given conditions, which require but usually do not receive close observation, in order to note and promptly to respond to any deviations from predetermined set or established conditions. The ascertainment of the condition of such variables according to previous practices has involved expensive and complex equipment requiring skillful installation and adjustments. Such devices of variable condition may comprise, illustratively, but not limitatively, pressure, both negative and positive, flow, weight, temperature, humidity, motion, position, by fluid pressure lines or reservoirs, temperature-responsive devices, flow meters, motions, or in fact any variable which can be manifested in deviation or change by a motion.

One prior art system for indicating a condition of a variable and deviations from a given condition thereof is represented by a transmitter-differential transformer having a primary energized by a source of A. C., in which the output of the transformer varies from an A. C. voltage of given phase, through a null output, to an A. C. voltage of phase substantially 180 degrees from the given phase, as the stator and armature of the transformer relatively move. In such installations one of said members is coupled to the movable portion of the device of variable condition, to cause relative movement of the armature and stator to cause generation of a signal or modifications of an existing generated signal from the transmitter. A circuit is established containing the output of the transmitter and the output of a second, or receiver-differential transformer also excited or energized by the source of A. C. feeding any unbalance between the outputs of the two transformers into an amplifier. Finally, the motor of the reversible type is provided, connected to the amplifier to run in one direction or the other or to remain stationary according to whether the secondaries circuit is balanced or unbalanced in a direction controlled by the sense of unbalance. The motor is coupled operatively to an element of the receiver-differential transformer to modify the output thereof as a function of running, and an indicator is coupled operatively to the motor for varying indication also moved as a function of motor running. By this assembly of plural component parts, the deviation in condition of the variable of the conditioned device is indicated by the indicator. It will be observed, however, that in even this simplified version of the controlling system it is necessary to provide two differential transformers, a reversible motor and indicator, as well as an amplifying device and circuit in order to secure the desired indication result. Of course, any other desired elements can be associated with the motor to actuate controls or the like.

It is among the objects of this invention: to secure indications of a condition and variations from a given condition by the use of a single differential transformer; to eliminate the parts heretofore necessary in effecting signals of deviations of condition of a conditioned device; to provide a differential transformer comprising a stator and an armature coupled to a controlled source of A. C. for excitation in which deviations in the relative positions of the armature and stator are manifested as an output of D. C. millivoltages; to provide as a packaged unit a differential transformer and a variable responsive device for coupling to a connection to a variable and with circuit means to furnish a D. C. millivoltage signal of condition of such variable by leads for subsequent attachment to a D. C. millivolt recorder or like instrument; and to provide other advantages as will become apparent as the description proceeds.

The figure of the drawing represents a schematic diagram of the invention, part of which is outlined to represent a box or container for a packaged unit, and using a purely illustrative differential transformer.

In carrying out the invention in the illustrative embodiment, a differential transformer is provided, the stator of which comprises primary and secondary windings, with the latter coupled in series opposition or at least so that the output leads have bucking voltages, with an armature movable relative to the respective windings of the stator to generate voltages preponderating in one or the other secondary windings, or equal and substantially cancelling in both windings for a null output, with two rectifiers oppositely disposed in the outputs from the respective secondaries to furnish a conjoint rectified voltage to a voltage divider, and with leads from opposite sides of the voltage divider having D. C. millivoltage output for actuating a signal-responsive millivoltmeter as a function of relative stator and armature position. The instrument may comprise a packaged unit containing a condition-responsive element for coupling to the variable, such, illustratively, as a Bourdon tube for coupling to a source of pressure, and may include leads for the A. C. input and leads for the millivoltage output as an article of manufacture. If desired, the D. C. leads may be contained in the package and associated with a millivoltmeter mounted in, or on, the package, to form a more complete packaged unit.

Referring now to the figure, there is disclosed a purely illustrative form of differential transformer available for use with and as a part of the invention herein. For purposes of illustration, the transformer shows the primary and secondary windings as separate coils, but it is to be understood that in the preferred embodiment the transformer is constructed in accordance with the teachings of my co-pending application Ser. No. 61,835, filed November 24, 1948. In this form of transformer two coils formed, each formed of a plurality of wires laid on in adjacency with the same number of turns in each coil, with a selected wire of the plurality of one coil interconnected with a selected wire of the plurality of the other coil to form a primary, and with another wire of the plurality of one coil interconnected with another wire of the plurality of the second coil to form secondaries, the output leads of which carry voltage of respectively opposite phases. The illustrative transformer as disclosed is usable for the purpose but the description which follows is intended to cover both types of differential transformers. A primary coil 10 is provided, having lead connections for attachment to a source of A. C. One lead may be for direct connection to one side of the A. C. source, but the other side of the source is arranged to pass through a potentiometer 11 for sharp and accurate control of the voltage passing through the primary 10. Preferably, but illustratively, the setting of the potentiometer 11 is such as to transmit substantially six volts to the primary coil 10. Secondary coils 13 and 17 are provided, which form with the primary coil the stator of the transformer. The secondaries may have any desired relation to each other and to the primary so as to function as later described, and the secondaries are incorporated in a network as follows: The inner or adjacent ends of the secondaries are connected respectively at terminals 8 and 9 to the ends of a voltage divider 14, while the outer ends of the respective secondaries are connected in network loop circuits 6 and 7 respectively, through a common tap connector 18 having a voltage dividing tap connection 19 on resistor voltage dividing element 14. Tap connection 19 is preferably adjustable for initial balancing of the network. The loop containing secondary 13 contains a rectifier 15 so that the flow through the voltage divider from point 19 to terminal 8 is rectified A. C. generated in secondary 13, and which is positive at the terminal 8. The loop containing the secondary 17 contains a rectifier 16 so that the flow through the voltage divider from point 19 to terminal 9 is rectified A. C. generated in secondary 17. The flow between points 8 and 9 on the voltage divider is in a direction according with the preponderance of plus voltage at a terminal 8 or 9. As in the usual course, for simplicity and economy, the coils 10, 13, and 17 are formed of copper or like metal having a positive temperature coefficient and it will be understood that changes of temperatures incident thereon will effect changes in their outputs. In order to effect automatic temperature compensations to maintain the same output conditions, it is desirable to incorporate in the system elements having negative temperature coefficients. In one illustrative case, the potentiometer 11 may be formed of such material, or, and preferably, a resistor 12 may be placed in the line from the A. C. source to the primary 10, so that by one or both means the increase in resistance and consequent decrease in output of the stator coils will be automatically compensated for by increasing the voltage in the primary 10. For the same reason, either alone, or in conjunction with the resistor 12 or potentiometer, the voltage divider 14 may be formed of such material having a coordinated negative temperature coefficient. In this case, the decrease in signal from the secondaries will be compensated by a decrease in resistance through the voltage divider 14 to maintain the relation of D. C. output across the terminals 8 and 9 to the signal generated in the secondaries. The packaged unit includes leads 20 and 21 connected to the respective terminals 8 and 9, having the interconnected condenser 22, and arranged to furnish the D. C. millivoltage output from the assembly. These connections are arranged for insertion into the millivolt recorder or millivoltmeter which is to be used therewith.

An armature mass 23 of magnetizable material is provided for motion relative to the stator, and preferably its relative motion is axial of the armature and coaxial and concentric with the axes of the respective coils of the stator, although as has been noted any relation of armature and stator may be used that will secure the signal results desired. The armature will be of suitable length relative to the stator, preferably long enough to extend partially into both secondaries when in the centered generally null output position, so as to have complemental inductive effects on the respective secondaries in response to the excitation of the primary coil 10. The complemental relation is such as to insure a substantially linear response in the respective signals in the secondaries as the armature and stator relatively move, so that when generally centered, the signals in both secondaries are equal and the net D. C. millivoltage output is substantially null, and so that the increase in magnitude of the D. C. millivoltage is proportional to the movement of the armature relative to the null position of armature and stator, and the direction of the flow is in accordance with the sense or direction of relative movement of the armature and stator.

To complete the packaged unit, a movable element responding to changes of the condition of the variable under consideration will be provided. This, of course, may be any device or element which can be caused to have a physical motion in response to variations of condition of the variable. Illustratively, when the instant variable can be indicated by pressure, it may comprise a Bourdon tube 25, anchored at one end as at 26 to a wall of the package with an exposed coupling or like attaching device for ultimate attachment to a source or container of pressure, susceptible to variations which are to be observed. As noted, such variations may be plus or minus from a given setting, or may be on one side only of a zero condition of no pressure. The free end 27 of the tube 25 is connected to the link 24 upon which the armature mass 23 is supported. The assembly is so disposed that increases of pressure elevate the free end 27 of the tube and thus move the armature 23 axially relative to the coils of the stator, illustratively moving in withdrawal relative to secondary 17 to reduce the inductive effects on that coil, while moving in entrance into coil 13 to increase the inductive effects on that coil.

The elements just described may comprise a boxed and packaged unit which can be mounted safely directly upon the connection to the variable condition to be recorded. In certain cases, if desired, a millivolt meter 28 can be provided mounted on or adjacent to the box or package for connection to the leads 20 and 21 to indicate fluctuations in the pressure. As such meters are very delicate, such millivoltmeter will not normally be a part of the package as suitable isolating supports therefor must be provided.

With attachment of one such assembly, or a plurality of such assemblies at various points in the plant, operated by various forms of condition-responsive devices, the respective leads will be brought to the instrument board for insertion into a standard millivolt recorder already in such plant. Of course, as such recorders are available to the public in large numbers as made by various large manufacturing organizations, it is not necessary to describe same in detail.

In the preferred form of utilization of the invention, the parts will be so assembled that with no pressure in the Bourdon tube, i. e. zero pressure, the armature 23 will be so disposed relative to the stator that there will be equal induction of A. C. in the coils 13 and 17, so that neither output preponderates over the other, so that there will be a substantially null output of D. C. millivoltage from the leads 20 and 21. With the expansion of the tube 25 with incidence of pressure thereon, the free end 27 thereof rises, pulling armature 23 upwardly relative to the stator. This complementally increases the A. C. voltage in secondary coil 13 and decreases it in secondary coil 17, which through the loop rectifier circuits will result in a D. C. output through leads 20 and 21, the amplitude of which increases proportionally to the motion of the armature from the substantially null position. This is the functioning when the assembly is set for a null output from the D. C. millivoltage leads from the transformer coordinated with zero condition of the conditioned device.

It will be clear that under certain conditions it may be desirable to indicate both plus and minus values on opposite sides of a given or set condition of the variable. Assume for this purpose that it is desired to indicate and to control the pressure incident on tube 25 at a set positive value, say, for purely illustrative instance, 50 P. P. S. With the assembly disclosed, the attitude of the Bourdon tube is coordinated with the relation of the armature mass 23 to the stator at which equal A. C. voltages are induced in the respective secondary coils, so that there is a null output of D. C. milli-voltage from the leads 20 and 21. In this case, with increase of pressure above the illustrative 50 P. P. S., the armature mass 23 moving toward coil 13 and away from coil 17 will generate a D. C. millivoltage through leads 20 and 21, as has been described above, in which the amplitude increases from the null output proportionally to the movement of the armature 23, as controlled by the expansion of the Bourdon tube 25 and the elevation of the free end 27 thereof. On the other hand, starting with the mass in substantially centered relation with null output of D. C. millivoltage, decrease in pressure in the Bourdon tube below the illustrative fifty P. P. S. causes the free end 27 thereof to approach the stator, thus moving the armature mass 23 away from the coil 13 and toward the coil 17. This causes a generation of A. C. voltage in coil 17 which preponderates over that generated in coil 13, so that the rectified voltage is reversed in sign and output through leads 20 and 21 is opposite to that when the armature is raised relative to the stator.

It will be appreciated that a millivoltmeter is a delicate instrument and that therefore, in the average installation, if a millivoltmeter is provided with the packaged unit, it will be for permanent installation on a shockproof agency, and not necessarily for mounting in or on the package. However, it will be appreciated that recorders as furnished by various instrument-makers are especially built for energization by millivoltage, as has been discussed, having all of the essentials for both indication and control built in, including multiple switching circuit controllers, (in many instances) so that by utilizing the terminal connectors for the recorders, the output from one or more of the signal generators of this invention can be brought into operative relation with such recorders, for selective alternative coupling therein. Such alternation, for instance, being to the input from one or a plurality of other millivolt signal generators, such as pyrometers. The control functions normally associated with such recorders, whereby the rate of flow, the pressure, the temperature, or any other variable is automatically controlled, will be found quite usable with the invention herein, to control the variable with which the instant invention is associated.

The device is rugged and essentially simple and is of accuracy within about ±1% and is capable of the utmost refinements in control in order to avoid the variations and nonproportional functionings attaching to prior art devices. In this connection it may be observed that the tap connection 19 of the voltage divider arm 16 is preferably made adjustable relative to the resistor 14, so that in setting up the instrument the null output balanced condition can be adjustably set to account for variations of various sorts that may arise in the circuit. There may be differences between the resistances of the rectifiers 15 and 18 which require that the tap 19 of arm 16 be placed closer to one terminal of the voltage divider resistance 14 than the other.

It is important that the A. C. input to the primary 10 be sharply controlled, at or about the illustrative 6 volts, for instance, in order that the only fluctuations in the signals from leads 20 and 21 be due to relative position changes of the armature and stator.

It will be appreciated that by the simple device disclosed, accurate and instantaneous signals can be obtained which can be read and responded to in a conventional millivoltmeter or recorder, as direct functions of changes of condition of a conditioned device, with great savings in cost, size, and volume displacement of the assembly, and which can be produced in multiple series as packaged units for easy installation at desired points in the plants of the users, and further, which, being completely free from arcs and sparks can be installed at any points in the plant at which the motivating conditioned device may be located, with perfect safety, as the generation of the millivolt output is completely free from circuit switches and relays, and the leads 20 and 21 can be run anywhere desired with safety as the millivolt output is of such minute nature as to be substantially incapable of arcing or sparking, even if inadvertently shorted.

Having thus described my invention, I claim:

A D. C. millivoltage signal generator responsive to movement of a member movable with changes of condition of a conditioned device, comprising a differential transformer comprising a coaxial armature and a hollow stator arranged for relative movements to generate a signal, said stator comprising primary and secondary windings in inductive relation to said armature, a network comprising a single potentiometer wire connecting an end of one secondary winding to an end of the other secondary winding, circuit means connecting the opposite ends of said respective secondary windings, a single movable arm for said potentiometer wire joining the circuit means and said potentiometer wire and forming two contiguous network loops each comprised of a portion of said potentiometer wire, a secondary coil, circuit means and said single movable arm, rectifying means in each loop, output leads connected respectively to the respective ends of the potentiometer wire and providing D. C. millivoltage signals proportional to the relative displacement of the armature and stator, and connectors for feeding a controlled source of A. C. to the said primary coil.

WILLIAM D. MACGEORGE.

References Cited in the file of this patent

UNITED STATES PATENTS

| Number | Name | Date |
|---|---|---|
| 1,533,680 | Wiederhold | Apr. 14, 1925 |
| 2,264,487 | Smulski | Dec. 2, 1941 |
| 2,408,524 | Mestas | Oct. 1, 1946 |
| 2,420,539 | Hornfeck | May 13, 1947 |
| 2,445,455 | Rights | July 20, 1948 |